(12) United States Patent
Strnad et al.

(10) Patent No.: US 12,443,021 B2
(45) Date of Patent: Oct. 14, 2025

(54) MICROSCOPE FOR IMAGING A SAMPLE

(71) Applicant: VIVENTIS MICROSCOPY SÀRL, Lausanne (CH)

(72) Inventors: Petr Strnad, Lausanne (CH); Andrea Boni, Prilly (CH); Prisca Liberali, Zürich (CH); Gustavo Quintas Glasner De Medeiros, Lörrach (DE)

(73) Assignee: VIVENTIS MICROSCOPY SÀRL, Lausanne (CH)

( * ) Notice: Subject to any disclaimer, the term of this patent is extended or adjusted under 35 U.S.C. 154(b) by 284 days.

(21) Appl. No.: 18/262,128

(22) PCT Filed: Jan. 21, 2022

(86) PCT No.: PCT/EP2022/051329
§ 371 (c)(1),
(2) Date: Jul. 19, 2023

(87) PCT Pub. No.: WO2022/157300
PCT Pub. Date: Jul. 28, 2022

(65) Prior Publication Data
US 2024/0094516 A1    Mar. 21, 2024

(30) Foreign Application Priority Data
Jan. 22, 2021 (CH) .................... 00061/21

(51) Int. Cl.
*G02B 21/00* (2006.01)
*G02B 21/18* (2006.01)
*G02B 21/36* (2006.01)

(52) U.S. Cl.
CPC ..... *G02B 21/0032* (2013.01); *G02B 21/0076* (2013.01); *G02B 21/18* (2013.01); *G02B 21/367* (2013.01)

(58) Field of Classification Search
CPC ............ G02B 21/00–368; G02B 25/00; G02B 25/001
(Continued)

(56) References Cited

U.S. PATENT DOCUMENTS

| 5,381,016 A | 1/1995 | Moriya |
| 7,554,725 B2 | 6/2009 | Stelzer et al. |

(Continued)

FOREIGN PATENT DOCUMENTS

| CN | 104155274 B | 11/2016 |
| CN | 106053346 B | 6/2018 |

(Continued)

OTHER PUBLICATIONS

Cole, M. J., et al. "Time-domain whole-field fluorescence lifetime imaging with optical sectioning." *Journal of Microscopy* 203.3 (2001): 246-257.

(Continued)

*Primary Examiner* — Jessica M Merlin
(74) *Attorney, Agent, or Firm* — Frost Brown Todd LLP

(57) ABSTRACT

A microscope is disclosed for imaging a sample. The microscope includes an illumination objective, a further illumination objective, an imaging objective and a further imaging objective, a sample holder, holder support and a drive system arranged to displace the sample holder along three perpendicular axes.

20 Claims, 4 Drawing Sheets

(58) Field of Classification Search
USPC .............. 359/368–398, 643–647, 656–661
See application file for complete search history.

(56) References Cited

U.S. PATENT DOCUMENTS

| | | | |
|---|---|---|---|
| 8,547,634 | B2 | 10/2013 | Power et al. |
| 8,970,950 | B2 | 3/2015 | Stelzer |
| 9,134,521 | B2 | 9/2015 | Huisken |
| 9,404,869 | B2 | 8/2016 | Keller |
| 9,880,378 | B2 | 1/2018 | Taniguchi et al. |
| 10,168,519 | B2 | 1/2019 | Rondeau |
| 10,222,601 | B2 | 3/2019 | Taniguchi et al. |
| 10,288,861 | B2 | 5/2019 | Shimada |
| 10,539,772 | B2 * | 1/2020 | Keller .................... G02B 21/10 |
| 10,684,457 | B2 | 6/2020 | Dohi et al. |
| 10,712,547 | B2 | 7/2020 | Taniguchi et al. |
| 10,802,262 | B2 | 10/2020 | Tomer et al. |
| 10,983,320 | B2 | 4/2021 | Hufnagel et al. |
| 10,983,322 | B2 | 4/2021 | Kalkbrenner et al. |
| 10,989,661 | B2 | 4/2021 | Fiolka et al. |
| 11,385,451 | B2 | 7/2022 | Hedde et al. |
| 11,422,347 | B2 | 8/2022 | Anhut et al. |
| 11,703,670 | B2 | 7/2023 | Anhut et al. |
| 2006/0066942 | A1 | 3/2006 | Kouno et al. |
| 2019/0310451 | A1 * | 10/2019 | Tomer ................ G02B 21/0032 |

FOREIGN PATENT DOCUMENTS

| | | |
|---|---|---|
| CN | 109596588 B | 10/2021 |
| DE | 102022200841 B3 | 5/2023 |
| DE | 102014104977 B4 | 11/2023 |
| EP | 2801855 A1 | 11/2014 |
| EP | 3264153 B1 | 5/2019 |
| EP | 3655809 A0 | 5/2020 |
| EP | 3707544 A0 | 9/2020 |
| EP | 3304167 B1 | 4/2021 |
| EP | 2829903 B1 | 9/2021 |
| JP | 6522361 B2 | 5/2019 |
| JP | 6685202 B2 | 4/2020 |
| JP | 7085364 B2 | 6/2022 |
| WO | WO 2007/124437 A2 | 11/2007 |
| WO | WO 2011/036096 A1 | 3/2011 |
| WO | WO 2014/180884 A1 | 11/2014 |
| WO | WO 2015/004107 A1 | 1/2015 |
| WO | WO 2015/036589 A1 | 3/2015 |
| WO | 2015054450 A1 | 4/2015 |
| WO | 2019016359 A1 | 1/2019 |
| WO | 2019092132 A1 | 5/2019 |
| WO | WO 2021/183945 A1 | 9/2021 |
| WO | WO 2023/017181 A1 | 2/2023 |

OTHER PUBLICATIONS

Greger, K., J. Swoger, and E. H. K. Stelzer. "Basic building units and properties of a fluorescence single plane illumination microscope." *Review of Scientific Instruments* 78.2 (2007).

Keller, Philipp J., Francesco Pampaloni, and Ernst HK Stelzer. "Three-dimensional preparation and imaging reveal intrinsic microtubule properties." *Nature Methods* 4.10 (2007); 843-846.

Wohland, Thorsten, et al. "Single plane illumination fluorescence correlation spectroscopy (SPIM-FCS) probes inhomogeneous three-dimensional environments." *Optics express* 18.10 (2010): 10627-10641.

Krzic et al., "Multiview light-sheet microscope for rapid in toto imaging," Nature Methods, vol. 9, No. 7, Jun. 3, 2012, 4 pages.

Royer et al., "A practical guide to adaptive light-sheet microscopy," Nature Protocols, Nature Publishing Group, GB, vol. 13, No. 11, Nov. 2018, pp. 2462-2500.

Girkin et al., "The light-sheet microscopy revolution," Journal of Optics, Institute of Physics Publishing, vol. 20, No. 5, Apr. 10, 2018, pp. 1-20.

Zagato et al., "Thechnical implementations of light sheet microscopy," Microscopy Research and Technique, vol. 81, No. 9, Sep. 1, 2018, pp. 941-958.

Poola Praveen Kumar et al., "Light sheet microscopy for histopathology applications," Biomedical Engineering Letters, The Korean Society of Medical and Biological Engineering, Korea, vol. 9, No. 3, Jul. 24, 2019, pp. 279-291.

Written Opinion and International Search Report issued Apr. 22, 2022 in Intl. Appl. No. PCT/EP2022/051329.

* cited by examiner

MICROSCOPE FOR IMAGING A SAMPLE

TECHNICAL FIELD

The present invention relates to a microscope for imaging and analyzing a sample.

BACKGROUND ART

Light sheet microscopy is a fluorescence microscopy method in which an illumination beam path (excitation light) and a detection beam path (emission light from the sample) are substantially perpendicular to each other. The sample is placed at an intersection of these paths. Sample scatters and absorbs excitation and emission light which results in low image quality when imaging at a position inside the sample where illumination light must travel over a long path into the sample and emitted light must travel over a long path to the outside of the sample.

Krzic et. al. describes a microscope arrangement which includes two illumination objectives and two imaging objectives arranged in one plane. Sample is placed in a sample holder located in between the four objectives. Because sample is imaged from two sides and illuminated from two sides even large samples can be imaged by choosing the illumination and imaging side with the shortest path through the sample to the imaged location. However, because of the sample holder being placed in a narrow area in between the four objectives only a single sample can be imaged at the same time.

In another embodiment described in EP2801855, the illumination objective as well as imaging objective are facing upwards and the sample is placed in a sample holder located above both objectives. A main advantage of this arrangement is that a plurality of samples can be imaged in parallel. However, using a single illumination and imaging objective prevents imaging large samples because of the inability to look and illuminate from both sides.

In another embodiment described in EP3655809 a microscope is using a single imaging objective facing vertically upwards and two opposing illumination objectives oriented horizontally. An advantage of having a plurality of samples imaged in parallel is preserved but because an image is acquired only from one side large samples are not possible to image.

Document EP3707544 further develops a sample holder for a microscope described in EP3655809 where multiple compartments are created, and plurality of samples can be imaged. However, only a single view is acquired, and large samples are thus not possible to image.

Therefore, there is a need for a system allowing an efficient imaging of large samples as well as imaging of a plurality of samples preferably in several separated compartments.

DISCLOSURE OF THE INVENTION

According to the invention this need is settled by a microscope as it is defined by the features of independent claim 1. Preferred embodiments of the invention are subject of the dependent claims.

In particular, the invention deals with a microscope for imaging a sample, comprising a first illumination objective, a second illumination objective, a first imaging objective, a second imaging objective, a sample holder and a holder support.

The sample holder is arranged to receive a sample. It has a portion which is light transparent. The term "light transparent" in this connection particularly relates to transparency to the first illumination light beam, the second illumination light beam and to the detection light. Light transparent may relate to being transparent to visible light, UV light, infrared light and/or others. By means of the sample holder, the sample can be safely kept at an appropriate position isolated from immersion medium in case immersion objective is used. Like this, it can be precisely exposed to the illumination light beam.

The holder support is arranged to support the sample holder. It has a drive system arranged to displace the sample holder along two or preferably three perpendicular axes relative to the imaging objective. Thereby, the holder support can be motorized. Like this, the sample holder can firmly be supported and be located or relocated so that the sample is precisely positioned for illumination and imaging. In particular, this allows to image multiple positions of the sample and multiple samples automatically.

The first illumination objective is arranged to eject a first illumination light beam along a first illumination path to illuminate the sample received by the sample holder through the light transparent portion such that light is ejected from the sample. The second illumination objective is arranged to eject a second illumination light beam along a second illumination path to illuminate the sample received by the sample holder through the light transparent portion such that light is ejected from the sample. Thereby, the first and/or second illumination light beams can be straight, redirected by suitable optical means or have any other appropriate form, particularly a form of a static light sheet or light sheet generated by scanning.

The illumination light beam can be centered on a back aperture of the illumination objective in which case the illumination path will be coincident or coaxial with the axis of the illumination objective. Alternatively, it can be de-centered in which case after the objective the illumination path will be angled relative to the axis of the illumination objective. The size and position of the illumination beam at the objective back aperture can be adapted to appropriately or sophisticatedly illuminate the sample or changed during an experiment in an automated way. The illumination light beam can be a laser light beam having a range of wavelengths adapted to the properties of the sample. In particular, the wavelength of the laser light beam can be suitable for excitation of fluorophores and fluorescence imaging.

Such a microscope allows for illumination of the sample from dual or plural directions. Particularly, this can be essential for comparably large samples such as biological samples in particular organoids where light from one side does not penetrate through the entire sample. Such illumination allows for reducing shadow effects in or on the sample impairing the quality of the imaging and allows imaging larger sample by bringing light into the sample from multiple directions.

The first imaging objective is arranged to receive detection light comprising at least a portion of the light ejected from the sample. The detection light is propagated along a first detection path angled to the illumination path. Preferably, the angle between the first detection path and the first and second illumination path is about 90°. The first imaging objective has a first imaging focal plane. Preferably, the first and/or the second illumination path lie(s) in the first imaging focal plane.

The second imaging objective is arranged to receive detection light comprising at least a portion of the light ejected from the sample. The detection light is propagated along a second detection path angled to the illumination path. Preferably, the angle between the second detection path and the first and second illumination path is about 90°. The second imaging objective has a second imaging focal plane. Preferably, the first and/or the second illumination path lie(s) in the second imaging focal plane.

The light ejected from the sample can particularly comprise emitted fluorescence light or light ejected by the first illumination objective and redirected or reflected by the sample.

The first and second illumination objectives are arranged such that in relation to the direction of gravity the first and second illumination path are both located below the bottom of the sample holder. The bottom of the sample holder may be a very bottom portion of the sample holder or a portion of the sample holder on or at which the sample is placed, if the two are not identical. In such arrangement the sample holder can move to image multiple positions of the sample and multiple samples without the sample holder interfering with the illumination paths. Further, in such arrangement the first and second illumination paths will not be parallel. Advantageously, in relation to direction of gravity, top ends of the first and second illumination objectives are positioned below a bottom of the sample holder. Advantageously, the light transparent portion of the sample holder is located in between the imaging objectives.

Using first and second imaging objectives, images from two opposing directions can be acquired allowing imaging of large samples impossible to image from one side only. Advantageously, images are captured using at least one detector which can be a camera.

Preferably, first and second focal planes are in an essentially vertical orientation along the direction of gravity. Angular deviation below around 20 degrees or preferably below 5 degrees from vertical orientation along the direction of gravity may be covered by essentially vertical orientation as they may not have significant impact. The vertical orientation can be achieved by the first and second imaging objectives being oriented essentially horizontally. Imaging in such orientations may be more efficient or easier to relate to the physical object by the user. The imaging objectives in this horizontal orientation allow access from top to place the sample holder.

The first imaging focal plane and the second imaging focal plane preferably overlap, wherein the first and second illumination paths lie in the first and second focal planes. In this configuration, within a single exposure and using the same illumination light an image from both sides can be acquired. For smaller samples which can be easily view from both sides this may double the amount of collected light. For large samples, the better of the two views can be selected after acquisition.

The first illumination light beam propagating along a first illumination path is preferably angled between 10 and 60 degrees to a horizontal plane and the second illumination light beam propagating along a second illumination path is preferably angled between 10 and 60 degrees to a horizontal plane. When imaging a sample, no other sample or object inside the sample should be located in the path of the incoming illumination beams because it would create shadows which would decrease image quality. Because different samples or objects within a sample to image may be located horizontally in the bottom part of the sample holder illuminating under an angle close to horizontal may require large spacing between multiple samples or objects within a sample. The smallest possible spacing between adjacent samples or objects within a sample would be achieved for illumination pointing vertically upwards. On the contrary to obtain best light penetration and thus imaging deep inside a large sample or object the illumination light beams should enter the sample from opposing sides, for example horizontally. The sharper the angle between the illumination light beams the less illuminated the far side of the sample will be. Illumination with both beams oriented parallel and entering from one side, for example vertically upwards, equals to single sided illumination not suitable for large samples. With illumination beams oriented between 10 and 60 degrees to horizontal an acceptable spacing between samples or objects within a sample and acceptable light penetration can be achieved. An optimal angle range may be between 20 and 50 degrees to horizontal. Below 20 degrees mechanical constraints of illumination objective and/or sample spacing may start to limit performance of the microscope. Above 50 degrees sample may not be optimally illuminated due to illumination close to single sided illumination. Best performance may be achieved around 30 degrees to horizontal.

Preferably, the drive system of the holder support is configured to displace the sample holder along X axis so that at least a part of the sample holder is located directly above the first illumination objective and/or second illumination objective along the direction of gravity. The location of the first illumination objective and second illumination objective below the sample holder may be advantageous because it allows a long travel range of a sample holder along the X axis. Sample holder can also be elongated in X direction to hold many samples for high throughput imaging. The sample holder can be displaced by the drive system along X axis so that at least a portion of the sample holder is positioned directly above the first or second illumination objective. The travel range and sample holder dimensions will thus not be limited by collision with housing or optical elements of the illumination objectives. Such configuration allows elongation of the light transparent portion of the sample holder which can be 3 cm, preferably 5 cm long or longer.

The light transparent portion of the sample holder preferably comprises transparent side walls and bottom, wherein the emitted light passes through the side walls of the sample holder and wherein the sample holder has an open top end. The open top end allows to place or manipulate the sample(s) or to exchange medium. The sample can be held in the sample holder only by gravity without the need for embedding in agarose or other support. Light emitted from the sample may pass through the light transparent side walls of the sample holder to the imaging objectives.

Light transparent portion of the sample holder to place a sample can be elongated along X direction. Such sample holder can be at least 2 centimeter (cm) in length, preferably 3 cm or 4 cm long to image multiple positions in a sample in parallel for high throughput imaging. For an organoid sample where individual organoids grow to a size of 500 micrometer 10 to 20 positions with imaged organoids can be imaged in a 2 cm long sample holder. Even higher throughput of up to 40 positions can be achieved on a length of 4 cm.

The light transparent portion of the sample holder may be elongated vertically to fit between the imaging objectives and intersect with the detection path and to efficiently collect light ejected by the sample. The light transparent portion may be elongated vertically to have at least 2 millimeter (mm) in height or preferably 4 mm to image large samples.

The light transparent portion of the sample holder preferably contains at least one indentation extending into the direction of gravity. Like this, illumination light may pass through the sides of the indentations directly to the position being imaged which minimizes the path the illumination light has to travel across the sample. This can be advantageous for samples embedded in gels such as matrigel where imaging through it degrades image quality. It can also minimize probability that an object in the sample is located in the illumination light path which would create shadow artefact. The indentation may further be beneficial to lower the sample and position it between the imaging objective when short working distance objective are used. In addition, the indentation(s) can stabilize free floating objects in the sample(s).

Preferably the sample holder contains one or multiple separation walls. Like this, at least two linearly arranged compartments can be created. An equivalent implementation to a sample holder containing one or multiple separation walls may be an array of at least two linearly arranged individual holders, wherein their side walls are forming the separation walls. To avoid that the sample is at a position where separation walls block illumination light beam the light transparent portion preferably contains the at least one indentation which bottom end may be at the same level or below a bottom end of the separation walls.

The separation walls preferably are made of a material transparent to the illumination light and emitted light. Like this, the sample(s) close to the separation walls can be efficiently illuminated and imaged.

The light transparent portion can be made of a material attached to the outside to the separation walls. The light transparent portion can be made from a film of plastic attached to the walls. The light transparent portion can alternatively also be a continuation of the walls of the sample holder. Preferably the light transparent portion is made of fluorinated ethylene propylene which is advantageous when using water immersion imaging objectives as it has similar refractive index to water.

In an embodiment the sample holder contains at least two pockets opened on top and having light transparent portion, wherein the light transparent portion forms at least the bottom and sides of the pockets and wherein each pocket is arranged to hold a different sample. An equivalent implementation to a sample holder containing at least two pockets may be an array of at least two linearly arranged individual holders each containing one or more individual pockets. The pockets may be downwardly elongated along the direction of gravity. With suitable dimensions the sample holder can contain up to 5 or 10 pockets arranged linearly next to each other such that samples in all of them can be imaged from both sides. Such pockets can be beneficial to hold many separated samples in parallel and can be optimally spaced so that when imaging the samples in adjacent pockets do not lie in the illumination light path and do not create shadows. The pockets can have shapes suitable for holding different types of samples, in particular shape of a cylinder, cone, cuboid or pyramid. Illumination light passes through the sides of the pockets directly to the position being imaged and unnecessary travel through sample can be avoided. This is advantageous for samples embedded in gels such as matrigel where imaging through it degrades image quality. To hold individual samples and fit within the imaging objectives such pockets can be at least 5 mm high. For samples of larger volumes pockets of 10 mm or more can be used.

To facilitate replacement of the objectives to change magnification or for service, the microscope preferably comprises a removably arranged platform, wherein the first illumination objective, the second illumination objective, the first imaging objective and the second imaging objective are mounted together on the platform. In such configuration, correct compatible set of pre-aligned illumination and imaging objectives can be conveniently removed and installed by the user.

To illuminate the sample at the detection focal plane a static sheet of light can be generated by a cylindrical lens. Such sheet of light will have a waist in which optimal optical sectioning and image quality is achieved. This waist will be elongated in direction perpendicular to the illumination path. When illuminating sample from opposing sides with illumination axis parallel to each other the waists from both sides are elongated in the same direction creating an elongated area with optimal optical sectioning and image quality. In this disclosure opposing illumination axis are not parallel leading to non-parallel axis of light sheet waists elongation which reduces the area where waists from both sides overlap thus reducing the area of optimal image quality. In addition for larger samples, when illuminating sample from opposing sides with illumination paths parallel to each other waists can be offset from each other further increasing area of optimal optical sectioning and image quality because each light sheet is illuminating one side or half of the sample. This approach can not be used when opposing illumination paths are not parallel because offsetting waists from each other will not increase the area of optimal optical sectioning and image quality. Similar argument is valid for light sheet generated by scanning where the waist is scanned perpendicular to the illumination axis.

To solve this problem the microscope preferably comprises an electronically controllable element, wherein the first illumination objective is configured to eject the first illumination light beam with a first beam waist and the second illumination objective is configured to eject the second light beam with a second beam waist, and wherein the electronically controllable element is configured to translate the first beam waist along the first illumination path and the second beam waist along the second illumination path. The microscope preferably includes an electronically controllable element which allows translation of the beam waist along the illumination axis. Such element can be a lens with a tunable focal length, deformable mirror, a lens which is axially mechanically translated, or the illumination objective can be axially translated. Such element can be placed in the first illumination path and in the second illumination path or in a common path of the two illuminations. In particular, the microscope preferably comprises an electronically controllable element, wherein the first illumination objective is configured to eject the first illumination light beam with a first beam waist and the second illumination objective is configured to eject the second light beam with a second beam waist, and wherein the electronically controllable element is configured to translate the first beam waist along the first illumination path and the second beam waist along the second illumination path.

Sheet of light is preferably generated by scanning of an illumination beam in the focal plane of first or second imaging objective along an axis perpendicular to the illumination axis. Such scanning can be realized by various means such as galvanometric scanner or acousto-optical system.

To solve the problem described above it is advantageous to synchronize light sheet generating scanning of beam with translation of the waist along the illumination axis. Preferably, a first sheet of light is generated by scanning of the first light beam in a direction perpendicular to the first illumination path and a second sheet of light is generated by scanning of the second light beam in direction perpendicular to the second illumination path, and wherein the first beam waist is translated along the first illumination path and the second beam waist is translated along the second illumination path in synchronization with the scanning such that the first beam waist is scanned along an axis which is parallel to an axis of scanning of the second beam waist. Like this, light sheets with waists which are elongated in a direction not perpendicular to the illumination axis can be generated. Preferably, the scanning and translation of the waist along the illumination axis is synchronized in such a way that waists of light sheets created by first illumination beam is parallel to the waist of light sheet created by second illumination beam. In this arrangement the waists of first and second by scanning generated illumination light sheets are elongated in the same direction creating an elongated area with optimal optical sectioning and image quality. In addition, waists can be offset to each other each illuminating one side or half of the sample further increasing the area with optimal optical sectioning and image quality. Alternatively, the scanning and translation of the waist along the illumination axis is synchronized in such a way that the waist of the first illumination beam, during the scanning, is in the center of the first half of the sample or imaged region and the waist of the second illumination beam, during the scanning, is in the center of the second half of the sample or imaged region. In this case, waists will not be scanned along a line but along a curve passing through the center of the region imaged with each illumination beam to optimally illuminate the sample.

Another solution of the problem described above can be used for static light sheet as well as light sheet generated by scanning. Preferably, the microscope is configured to acquire a plurality of images of the same position of the sample including: an image of the sample illuminated with the first light beam having the first beam waist at a first position, an image of the sample illuminated with the first light beam having the first beam waist translated along the first illumination path to a different second position, an image of the sample illuminated with the second light beam having the second beam waist at a first position, and an image of the sample illuminated with the second light beam having the second beam waist translated along the second illumination path to a different second position. Thus, to extend the area covered by waists of first and second illumination light sheets preferably a set of following images is acquired: 1) image of a sample illuminated with first light beam having first waist at position; 2) image of a sample illuminated with first light beam having first waist translated along first illumination path to different position; 3) image of a sample illuminated with second light beam having second waist at position; 4) image of a sample illuminated with second light beam having second waist translated along second illumination path to different position. This set of images covers area which would be covered by opposing parallel beams with waists offset from each other. Only waists of the beams are translated without moving the sample which would reduce the speed of imaging.

These images are preferably combined to reconstruct a combine image where portions of the image illuminated by waist of each beam is taken into the combined image generating a larger area with optimal optical sectioning and image quality. Preferably, the microscope is configured to reconstruct a combined image from the plurality of images by combining portions of the plurality of images illuminated by the waist of the light beams. Because only combined image may be stored, the space required to store experimental data is reduced.

To obtain image of the same sample location using first and second imaging objective simultaneously, the first and second imaging focal plane advantageously overlap. The microscope preferably contains a first focusing system to translate the first imaging focal plane of the first imaging objective along first detection path. This focusing system can be used to align focal planes.

Preferably, the microscope contains a second focusing system to translate the second imaging focal plane of the second imaging objective along the second detection path. This focusing system can be used to align focal planes.

Such focusing element can be implemented by mechanical translation of imaging objective or detector such as camera. Alternatively, a lens with variable focal length or zoom system can be placed between the first and/or second imaging objective and detector.

Preferably, the first focusing system is electronically controlled, the second focusing system is electronically controlled, or the first and second focusing systems are electronically controlled. Like this, the focal planes can be automatically aligned during a long-term experiment and/or during acquisition of z-stack of images of the sample.

Such electronically controlled focusing systems can be realized using electronically controlled deformable mirrors or electronically controlled lenses with tuneable focal lengths. These elements can preferably be placed in a detection light path between relay lenses at a position where an image of the imaging objective back focal plane is located. These elements can be controlled at high speed and deformable mirror can be used to apply other higher order corrections beside defocus.

These electronically controlled focusing elements can be synchronized with translation of the light sheet along the detection path for fast acquisition of z-stacks of images of the sample.

Beside fluorescence it can be advantageous to acquire images of the sample in transmitted light. Such image can be used to locate the sample as well as observe it. The microscope preferably comprises at least one light source arranged to illuminate the sample through the first imaging objective and/or through the second imaging objective, and to collect the transmitted light through the second imaging objective and/or the first imaging objective, respectively, to generate a transmission image of the sample. Thereby, one imaging objective may serve as a condenser for transmitted light and the other imaging objective to acquire transmission image. In this way, high quality transmission image of the sample can be acquired from both sides.

BRIEF DESCRIPTION OF THE DRAWINGS

The microscope and the methods according to the invention are described in more detail herein below by way of exemplary embodiments and with reference to the attached drawings, in which.

DESCRIPTION OF EMBODIMENTS

Figure 1:
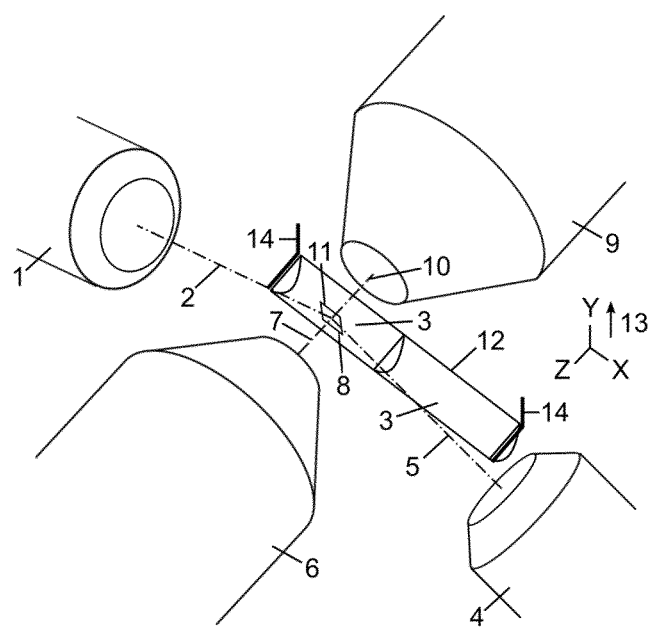
FIG. 1 shows a schematic overview of an embodiment of a microscope according to the invention.

FIG. 1 shows an embodiment of a microscope according to the invention. It comprises a first illumination objective (1) arranged to eject a first illumination light beam along a first illumination path (2) to illuminate the sample (3), second illumination objective (4) arranged to eject a second illumination light beam along a second illumination path (5) to illuminate the sample (3), first imaging objective (6) arranged to receive detection light propagated along a first detection path (7), second imaging objective (9) arranged to receive detection light propagated along a second detection path (10). The first and second imaging objectives have focal planes (8, 11).

A holder support (14) is arranged to receive the sample holder (12) with sample (3). Holder support has a drive system arranged to displace the sample holder at least along two perpendicular axes (X, Y) and preferably along three perpendicular axes (X, Y, Z). Imaging objectives are placed horizontally perpendicular to the direction of gravity (13). Imaging objectives can be immersion objectives in which case the sample holder and the front lens of the imaging objectives are immersed in an immersion medium. Illumination light from the illumination objectives, in case these are not also immersion objectives, is then entering into the immersion medium through a window transparent to the illumination light such a glass window. Two separate transparent windows, one for each objective, can be used or a single window for both objectives made for example by a meniscus lens cut on the sides facing the illumination objectives or a meniscus cylindrical lens.

Figure 2:
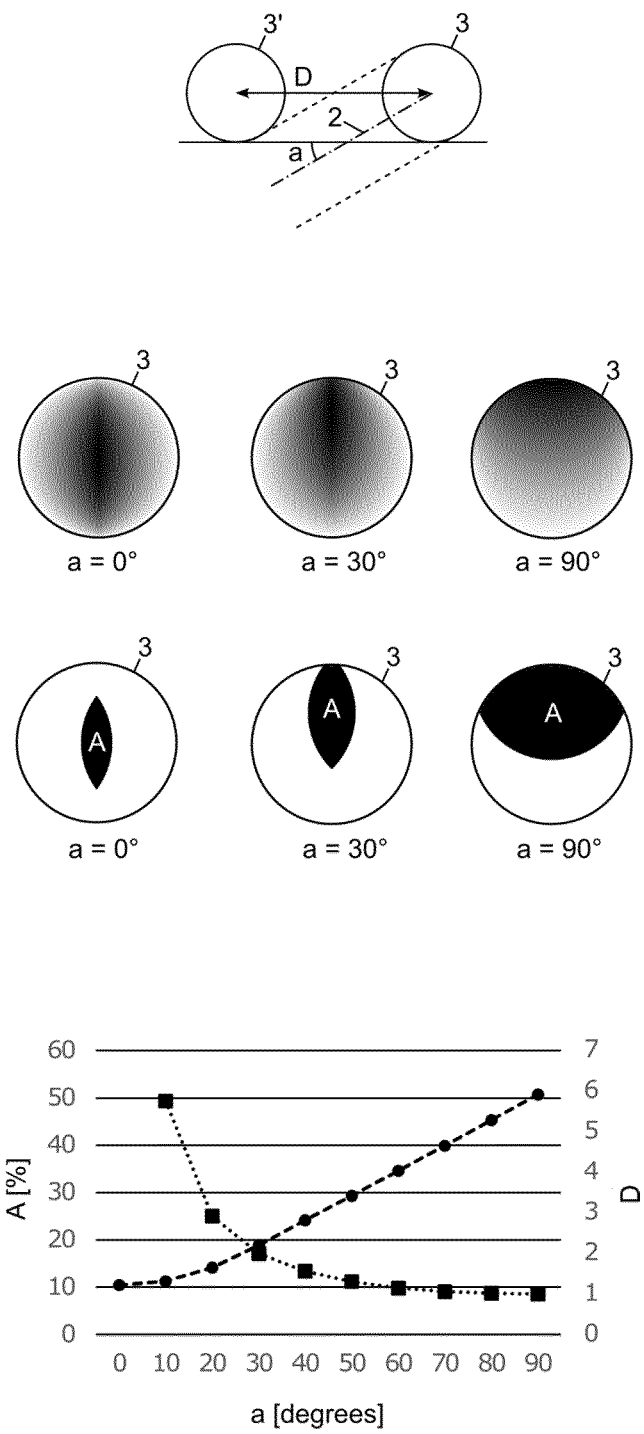
FIG. 2 shows geometry of illumination of sample by illumination light beam.

FIG. 2 shows a simplified schematic of sample (3) illuminated along an illumination axis (2) by an illumination light beam. Top: For a circular object in a sample (3) illuminated along an illumination axis (2) angled at an angle (a) to horizontal plane (solid line) the incoming light will propagate in space between two dashed lines parallel to the illumination axis (2). Other samples or objects in a sample (3') can only be placed at such positions where they do not intersect the incoming light, shortest such distance for two horizontally spaced circular objects (D) is shown. If other sample or object in a sample (3') would intersect with incoming light it would scatter or refract it and a shadow would appear on image of sample (3). It is apparent that the larger the angle (a) between illumination axis (2) and horizontal plane the smaller the shortest possible spacing (D) between objects in a sample or samples.

Middle: Penetration of illumination light into sample limits imaging of larger samples. Length the illumination light travels inside a circular object in a sample (3) is shown by grey gradient. For a circular object of radius R an area A into which illumination light travels distance larger than 0.8*R through the object is shown in black. In this comparison such area is considered insufficiently illuminated for imaging. When illuminating with two opposing beams directed horizontally (left, a=0 degrees) area A is smallest (~10% of sample cross section) and with increasing angle the area A is larger. For illumination from one side (right, a=90 degrees) area A is more than 50% of sample cross section.

Bottom: It is desirable to image objects in sample or samples placed as close as possible to each other to image as many as possible in parallel. On the other hand, it is desirable to illuminated with beams angled as close as possible to opposing beams which illuminate sample most efficiently. The relation between angle (a) and the area (A, circle, dashed line) which in this comparison is considered insufficiently illuminated and the minimal object or sample spacing (D, square, dotted line) is show in a graph.

It can be seen from this graph that these effects are opposing, and it is not possible to have smallest insufficiently illuminated area (A) as well as smallest distance between samples or objects in a sample (D). With illumination beams oriented between 10 and 60 degrees to horizontal acceptable spacing between the sample and acceptable light penetration can be achieved. An optimal angle range is between 20 and 50 degrees to horizontal. Best compromise is achieved around 30 degrees to horizontal.

Figure 3:
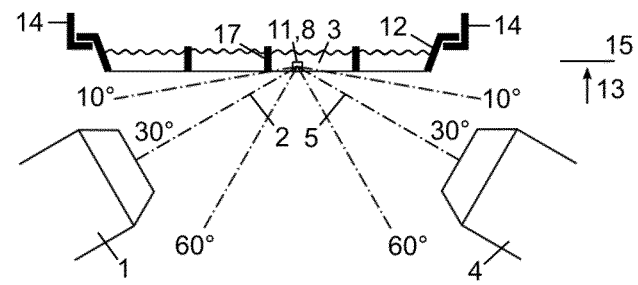
FIG. 3 shows a cross sections of a sample holder of a microscope of FIG. 1.
Figure 3:
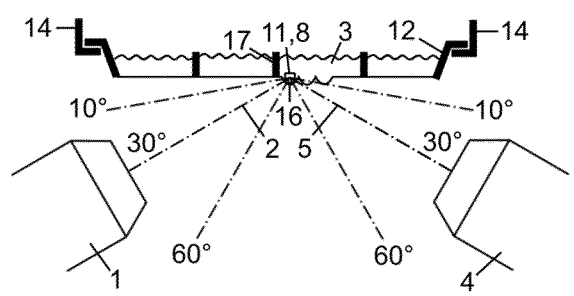
Figure 3:
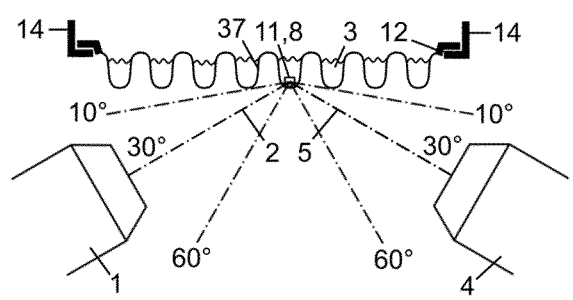
Figure 3:
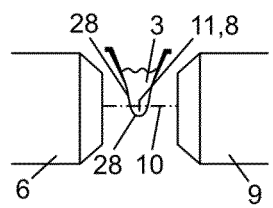

FIG. 3 shows a front (top three panels) and side (bottom panel) cross sections of sample holders of a microscope according to the invention. Sample holder (12) is held in a microscope by a holder support (14). It has light transparent portion (28) forming sides and bottom and it is elongated along X direction. Sample holder contains separation walls (17) to create at least two linearly arranged compartments. Separation walls may be transparent to the illumination and detection light so that sample close to the walls can be imaged. The light transparent portion (28) of the sample holder (12) may contain indentations (16). Such indentations have bottom below the separation walls so that illumination and detection light can propagate to and from sample without intersecting with separation walls. Illumination objectives (1, 4) are arranged such that the first and second illumination path (2, 5) are located below a bottom of the sample holder (12) and illumination paths (2, 5) are angled between 10 and 60 degrees to a horizontal plane (15) which is perpendicular to the direction of gravity (13). In an alternative embodiment the sample holder contains an array of pockets (37) opened on top and having light transparent portion (28) at least at the bottom and sides. Pockets (37) are elongated downwards along the direction of gravity (13). Such pockets are used to hold many separated samples in parallel and can be optimally spaced so that when imaging each sample the samples in adjacent pockets do not lie in the illumination light path and do not create shadows.

Figure 4:
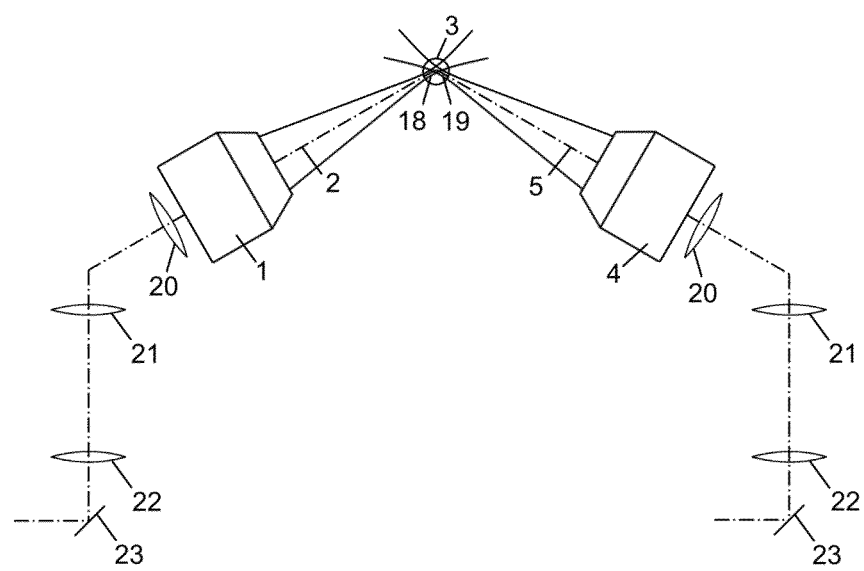
FIG. 4 shows a side view of the illumination path of a microscope of FIG. 1.
Figure 4:
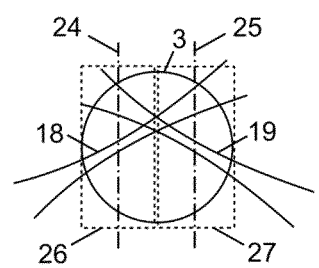
Figure 4:
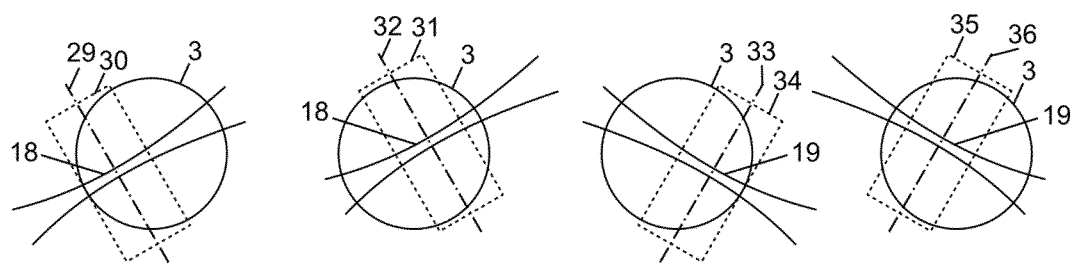

FIG. 4 top shows a side view of the illumination path of a microscope according to the invention. Illumination beam propagating along illumination path (2) is reflected by a galvanometric scanner mirror (23) to generate a scanned light sheet and passes through scan lens (22) generating a beam focus which is de-magnified by a tube lens (21) and objective (1) on to the sample (3) where it has a waist (18). A lens with a tunable focal lens (20) is placed in the light path to translate the beam waist (18) along the illumination axis. Elements described above are placed in an identical arrangement along a second illumination axis (5) containing a second illumination objective (4) and generating second beam waist (19).

Middle: To illuminate first half (26) of an object in the sample (3) using the first waist (18) the light sheet generating scanning of the first illumination beam is synchronized with translation of the first waist (18) along first illumination axis such that the first waist is scanned along axis 24. To illuminate second half (27) of an object in the sample (3) using the second waist (19) the light sheet generating scanning of the second illumination beam is synchronized with translation of the second waist (19) along second illumination axis such that the second waist is scanned along axis 25. Axis 24 and 25 are parallel and sample is optimally illuminated with each beam waist covering half of the object in the sample.

Bottom: Sample can be optimally illuminated using a static and scanned light sheet using the following sequence. An object in the sample is illuminated by a first light sheet with waist (18) elongated or scanned along axis (29) to illuminating first half of the object (30). The waist (18) of the first light sheet is then translated along first illumination axis (2) and second half of the object in the sample (31) is illuminated with first light sheet having waist (18) elongated or scanned along axis (32). An object in the sample is then illuminated by a second light sheet with waist (19) elongated or scanned along axis (33) to illuminating first half of the object (34). The waist (19) of the second light sheet is then translated along second illumination axis (5) and second half of the object (35) is illuminated with second light sheet having waist (19) located or scanned along axis (36). Sample objects can thus be optimally illuminated from both sides and with beam waists covering the sample.

A separate image using each illumination step above can be acquired. These images are then combined to reconstruct a combined image of the object in the sample (3) where portion of each image illuminated by beam waist is taken into the combined image. Alternatively, some or all the illumination steps can happen within the same camera exposure generating an averaged image of the sample.

The invention claimed is:

1. A microscope comprising:
   a sample holder configured to receive a sample and having a light transparent portion;
   a first illumination objective arranged to eject a first illumination light beam along a first illumination path to illuminate the sample received by the sample holder through the light transparent portion of the sample holder such that light is ejected from the sample;
   a second illumination objective arranged to eject a second illumination light beam along a second illumination path to illuminate the sample received by the sample holder through the light transparent portion of the sample holder such that light is ejected from the sample;
   a first imaging objective arranged to receive detection light comprising at least a portion of the light ejected from the sample, wherein the detection light is propagated along a first detection path angled at about 90° to the first and second illumination paths and wherein the first imaging objective has a first imaging focal plane;
   a second imaging objective arranged to receive detection light comprising at least a portion of the light ejected from the sample, wherein the detection light is propagated along a second detection path angled at about 90° to the first and second illumination paths and wherein the second imaging objective has a second imaging focal plane; and
   a holder support arranged to support the sample holder, wherein, relative to a direction of gravity, the first and second illumination objectives are arranged such that the first and second illumination path are located below a bottom of the sample holder,
   wherein the first and second illumination paths are not parallel, and
   wherein the holder support has a drive system arranged to displace the sample holder along two perpendicular axes relative to the first and second imaging objectives.

2. The microscope of claim 1, wherein the first imaging focal plane and the second imaging focal plane are essentially vertically oriented along the direction of gravity.

3. The microscope of claim 1, wherein the first imaging focal plane and second imaging focal plane overlap, and wherein the first illumination path and the second illumination path lie in the first imaging focal plane and the second imaging focal plane.

4. The microscope of claim 1, wherein the first illumination path is angled between 10 degrees and 60 degrees to a horizontal plane, and wherein the second illumination path is angled between 10 degrees and 60 degrees to the horizontal plane.

5. The microscope of claim 1, wherein the drive system of the holder support is configured to displace the sample holder so that at least a part of the sample holder is located directly above the first illumination objective and/or second illumination objective along the direction of gravity.

6. The microscope of claim 1, wherein the light transparent portion of the sample holder contains the bottom of the sample holder and side walls of the sample holder, wherein the emitted light passes through the side walls of the sample holder and wherein the sample holder has an open top end.

7. The microscope of claim 1, wherein the light transparent portion of the sample holder has a length along the X axis of at least two centimeters, and wherein the drive system of the holder support 1S configured to displace the sample holder at least two centimeters along the X axis.

8. The microscope of claim 1, wherein the light transparent portion of the sample holder contains at least one indentation extending into the direction of gravity.

9. The microscope of claim 1, wherein the sample holder contains separation walls.

10. The microscope of claim 9, wherein the light transparent portion of the sample holder contains at least one indentation extending into the direction of gravity, and wherein a bottom end of the indentation of the sample holder is at the same level or below a bottom end of the separation walls of the sample holder.

11. The microscope of claim 9, wherein the separation walls are light transparent, and/or
   wherein the light transparent portion of the sample holder is made of a material attached to an outside of the separation walls.

12. The microscope of claim 1, wherein the sample holder contains at least two pockets opened on top and extending into the direction of gravity wherein the light transparent portion forms at least the bottom and sides of the pockets and wherein each pocket is arranged to hold a different sample.

13. The microscope of claim 1, comprising a removably arranged platform, wherein the first illumination objective, the second illumination objective, the first imaging objective and the second imaging objective are mounted on the platform.

14. The microscope of claim 1, comprising an electronically controllable element, wherein the first illumination objective is configured to eject the first illumination light beam with a first beam waist and the second illumination objective is configured to eject the second light beam with a second beam waist, and wherein the electronically controllable element is configured to translate the first beam waist along the first illumination path and the second beam waist along the second illumination path.

15. The microscope of claim 14, wherein a first sheet of light is generated by scanning of the first light beam in a direction perpendicular to the first illumination path and a second sheet of light is generated by scanning of the second light beam in direction perpendicular to the second illumination path, and wherein the first beam waist is translated along the first illumination path and the second beam waist is translated along the second illumination path in synchronization with the scanning such that the first beam waist is scanned along an axis which is parallel to an axis of scanning of the second beam waist.

16. The microscope of claim 14,
configured to acquire a plurality of images of the same position of the sample including
- an image of the sample illuminated with the first light beam having the first beam waist at a first position,
- an image of the sample illuminated with the first light beam having the first beam waist translated along the first illumination path to a different second position,
- an image of the sample illuminated with the second light beam having the second beam waist at a first position, and
- an image of the sample illuminated with the second light beam having the second beam waist translated along the second illumination path to a different second position, and preferably configured to reconstruct a combined image from the plurality of images by combining portions of the plurality of images illuminated by the waist of the light beams.

17. The microscope of claim 1, comprising:
a first focusing system arranged to translate the first imaging focal plane of the first imaging objective along the first detection path, and/or
a second focusing system arranged to translate the second imaging focal plane of the second imaging objective along the second detection path.

18. The microscope of claim 17,
wherein the first focusing system is electronically controlled, the second focusing system is electronically controlled, or the first and second focusing systems are electronically controlled, or
wherein the first focusing system is realized using an electronically controlled deformable mirror, the second focusing system is realized using an electronically controlled deformable mirror, or the first and second focusing systems are realized using an electronically controlled deformable mirror, or
wherein the first focusing system is realized using an electronically controlled lens with tuneable focal length, the second focusing system is realized using an electronically controlled lens with tuneable focal length, or the first and second focusing systems are realized using an electronically controlled lens with tuneable focal lengths.

19. The microscope of claim 1, comprising a light source arranged to illuminate the sample through the first imaging objective and to collect the transmitted light through the second imaging objective to generate a transmission image of the sample; and
preferably comprising a light source arranged to illuminate the sample through the second imaging objective and to collect the transmitted light through the first imaging objective to generate the transmission image of the sample.

20. The microscope of claim 1, wherein the drive system of the holder support is arranged to displace the sample holder along three perpendicular axes relative to the first and second imaging objectives.

* * * * *